United States Patent [19]

Kudo et al.

[11] 4,288,421

[45] Sep. 8, 1981

[54] PROCESS OF TREATING EXHAUST GAS CONTAINING NITROGEN OXIDES AND SULFUR DIOXIDE

[75] Inventors: Yoshihiko Kudo; Hiroshi Hagiwara, both of Iwaki, Japan

[73] Assignee: Kureha Kagaku Kogyo Kabushiki Kaisha, Tokyo, Japan

[21] Appl. No.: 57,815

[22] Filed: Jul. 16, 1979

[30] Foreign Application Priority Data

Jul. 28, 1978 [JP] Japan ................................ 53/92222

[51] Int. Cl.$^3$ ............................................ B01D 53/34
[52] U.S. Cl. ..................................... 423/395; 423/242
[58] Field of Search .................... 423/235, 242 A, 422, 423/563, 573, 574

[56] References Cited

U.S. PATENT DOCUMENTS

| | | | |
|---|---|---|---|
| 3,904,743 | 9/1975 | Urban | 423/242 A |
| 3,932,587 | 1/1976 | Grantham et al. | 423/422 |
| 3,987,147 | 10/1976 | Guerrieri | 423/422 |
| 3,991,161 | 11/1976 | Saitoh et al. | 423/235 |
| 4,122,148 | 10/1978 | Nicholson et al. | 423/422 |
| 4,141,961 | 2/1979 | Miller | 423/563 |
| 4,186,176 | 1/1980 | Kitamura et al. | 423/235 |

FOREIGN PATENT DOCUMENTS

2833440 2/1979 Fed. Rep. of Germany ...... 423/235

*Primary Examiner*—G. O. Peters
*Attorney, Agent, or Firm*—Wegner & Bretschneider

[57] ABSTRACT

A process of treating an exhaust gas containing $NO_x$ and $SO_2$ comprising bringing the gas into contact with an absorbing solution containing iron chelate salt and potassium sulfite, cooling the solution to crystallize and separate absorption products of potassium imidodisulfonate, potassium dithionate and potassium sulfate, heating the separated products at 250° to 400° C. to decompose the potassium dithionate into potassium sulfate and sulfur dioxide, then decomposing the potassium imidodisulfonate into ammonia and simultaneously reducing the potassium sulfate into potassium polysulfide and potassium carbonate, and converting the potassium polysulfide into hydrogen sulfide, gaseous sulfur and potassium carbonate.

5 Claims, 1 Drawing Figure

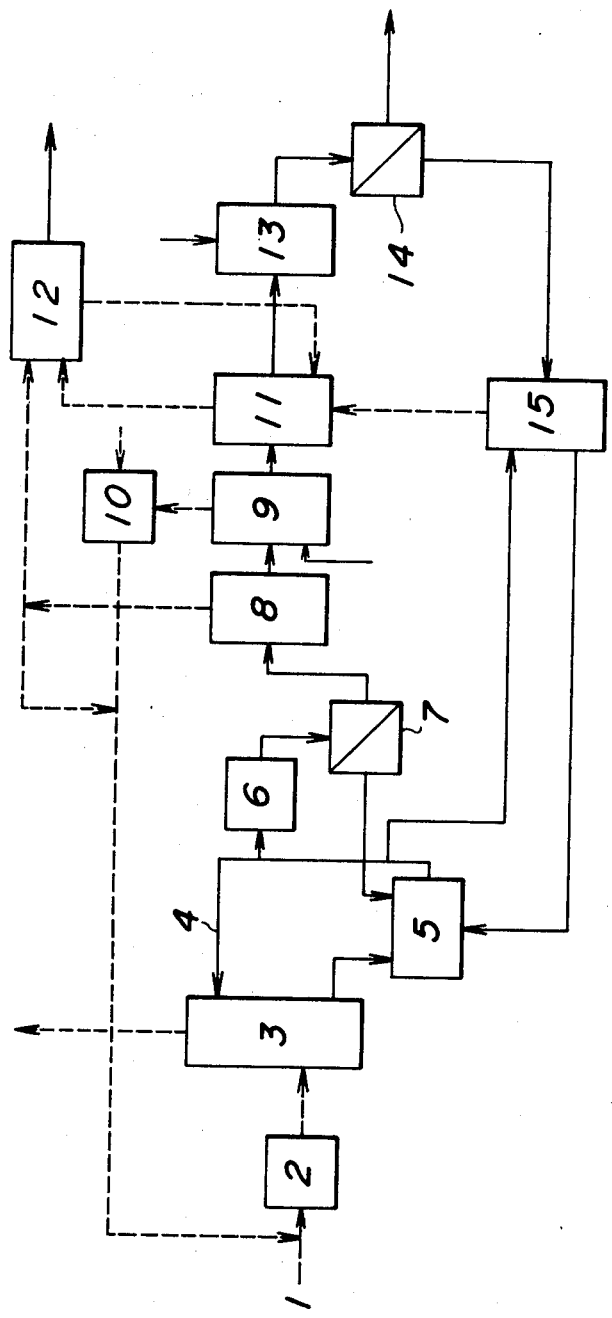

PROCESS OF TREATING EXHAUST GAS CONTAINING NITROGEN OXIDES AND SULFUR DIOXIDE

This invention relates to a process of treating relates to a process of treating an exhaust gas containing nitrogen oxides ($NO_x$) and gaseous sulfur dioxide ($SO_2$), and more particularly relates to a process of treating absorption products such as potassium imidodisulfonate, potassium dithionate and potassium sulfate produced by the absorption of the nitrogen oxides and the sulfur dioxide into an aqueous absorbing solution containing at least an iron chelate salt and a potassium sulfite.

As a method for simultaneously absorbing and removing $NO_x$ and $SO_2$ contained in the exhaust gas, there has been known so far a process for absorbing them in an aqueous solution containing an iron chelate salt and an alkali sulfite to fix them in the form of imidodisulfonate, as disclosed in U.S. Pat. Nos. 3,991,161 and 3,992,508. The absorption products resulted in the process include a dithionate and a sulfate as by-products in addition to the imidodisulfonate. It is, however, difficult and not advantageous in view of cost to isolate these products into useful forms. It is thus desired to convert them into useful ammonia or nitrogen gas, or into elemental sulfur.

In view of the above, a process is proposed, for example as in Japanese Patent Laid Open No. 108682/76, which hydrolyzes under an acidic condition of sulfuric acid an imidodisulfonate thus produced in the absorption solution into sulfamic acid without separating it from the absorption solution and further carries out the reaction of the sulfamic acid with nitrous acid to form nitrogen. However, hydrolysis of the imidodisulfonate at a low concentration in the absorption solution as it is without separation requires a great amount of sulfuric acid and is also disadvantageous in view of heat economy. In addition simultaneous decomposition of a dithionate produced as by-product upon absorption requires more severe hydrolyzing conditions.

As another method, Japanese Patent Laid Open No. 125670/76 also describes a process comprising oxidizing a part of an alkali sulfite in the solution into an alkali sulfate, then converting the alkali sulfate into gypsum, separating the gypsum and then after the separation of imidodisulfonate from the residual filtrate converting the imidodisulfonate into ammonium sulfate through hydrolysis. However, in the process including the step of alkali sulfate-gypsum conversion the gypsum is present in the state of dissolution in the recycling solution, which is apt to precipitate as calcium sulfite scales if the alkali sulfite concentration in the solution is increased. The alkali sulfite concentration can not thus be increased and, accordingly, a ferric salt produced through oxidation upon absorption can not be reduced into a ferrous salt at a sufficient rate industrially. Then, in this case is required an additional means in which the ferric salt is reduced into the ferrous salt with use of a sulfide or the like.

The object of the present invention is to propose a process for effective treatment of the exhaust gas containing $NO_x$ and $SO_2$ in which potassium sulfite used as an alkali sulfite in the absorption solution is present at a high concentration, the absorption products are crystallized to be separated as potassium salts of lower solubility while reducing, at a sufficient rate, a ferric salt produced through oxidation upon absorption into a ferrous salt and, therefore, nitrogen oxides, $NO_x$, are converted into gaseous ammonia or nitrogen, and sulfur dioxide, $SO_2$, is converted into hydrogen sulfide or sulfur.

Accordingly, this invention provides a process of treating an exhaust gas containing nitrogen oxides and sulfur dioxide wherein the exhaust gas is brought into contact with an aqueous absorbing solution containing at least iron chelate salt and potassium sulfite to produce absorption products of potassium imidodisulfonate, potassium dithionate and potassium sulfate, the absorbing solution containing the absorption products is cooled to crystallize and separate the absorption products and the filtrate is recycled to the above-mentioned contact of the exhaust gas with the absorption solution, characterized in further including a step of heating the separated absorption products to a temperature of 250 to 400° C. to convert the potassium dithionate into potassium sulfate and sulfur dioxide, a step of thermally decomposing the residual potassium imidodisulfonate into gaseous ammonia and at the same time reducing the residual potassium sulfate into potassium polysulfide and potassium carbonate, and a step of converting the potassium polysulfide under the presence of carbon dioxide and steam into hydrogen sulfide, gaseous sulfur and potassium carbonate.

This invention is, hereinafter, to be explained referring to accompanying drawing.

The accompanying drawing is a process chart showing one embodiment of this invention.

An exhaust gas 1 at a high temperature containing $NO_x$ and $SO_2$ is cooled in a cooling tower 2 below 100° C., preferably, below 80° C., so that the temperature of an absorbing solution contacted with the gas in an absorption tower 3 may not, desirably, rise above 70° C. anywhere in the tower 3. This is desired since the chelating agent of an iron chelate salt in the absorbing solution tends to easily decompose at a temperature of the absorbing solution above 70° C., and it is particularly desired to cool the temperature of the absorbing solution below 60° C. in the use of ethylenediaminetetraacetate as the chelating agent. It is desired to remove dusts, hydrogen chloride or the like contained in the exhaust gas in this cooling tower 2.

The exhaust gas 1 after cooling is introduced into the absorption tower 3 and brought into contact with the absorbing solution introduced from a pipe 4 to absorb $NO_x$ and $SO_2$ into the solution. The absorbing solution from the pipe 4 is an aqueous solution containing 0.1–0.5 mol/kg, preferably 0.2–0.4 mol/kg of iron chelate salt and 0.4–2.5 mol/kg, preferably 0.8–1.6 mol/kg of potassium sulfite and potassium hydrogen sulfite and having a pH value of 5.5 to 7.5. Preferred chelating agents used herein include aminopolycarboxylic acid such as ethylenediaminetetraacetate and nitrilotriacetate or the like.

The solution which absorbed $NO_x$ and $SO_x$ in the absorption tower 3 is further recycled through a recycle tank 5 to the absorption tower 3, but is partially branched and cooled in a crystallizer 6 to 10° C.–35° C., preferably 30° C.–35° C., to crystallize out potassium imidodisulfonate, potassium dithionate and potassium sulfate contained in the solution as absorption products. A vacuum cooling method is desired for the cooling crystallization to prevent the formation of scales and improve the water balance in the adsorption system. Crystals thus crystallized are separated in a separator 7 and the filtrate is returned to the recycle tank 5. The mixture of the separated crystals is heated indirectly in a thermal decomposer 8 to 250° C.–400° C., desirably, 270° C.–310° C. to thermally decompose the potassium dithionate in the crystal mixture into $SO_2$ and potassium sulfate.

$$K_2S_2O_6 \rightarrow K_2SO_4 + SO_2 \quad (1)$$

While the potassium imidodisulfonate $NH(SO_3K)_2$ is also hydrolyzed partially if water is present in the decomposer 8, this provides no troubles for the thermal decomposition of $K_2S_2O_6$.

$$NH(SO_3K)_2 + 2H_2O \rightarrow K_2SO_4 + NH_4HSO_4 \quad (2)$$

The $SO_2$ gas thus generated is at least partially sent to a below-mentioned Claus reactor 12 and other portions of the gas can be used as a raw material for preparing $H_2SO_4$ if required. Subsequently, the potassium sulfate of the absorption product, also containing that produced through the above reactions (1) and (2) is reduced in a reduction furnace 9 into potassium polysulfide $K_2S_x$ ($1<x<2$) and potassium carbonate.

$$2K_2SO_4 + 7/2\ C \xrightarrow{fast} K_2S_2 + K_2CO_3 + 5/2\ CO_2 \quad (3)$$

$$4K_2S_2 + 4K_2CO_3 \xrightarrow{slow} 7K_2S + K_2SO_4 + 4CO_2 \quad (4)$$

$$(3) \times 4 + (4)\ K_2SO_4 + 2C \longrightarrow K_2S + 2CO_2 \quad (5)$$

By the way, a method of production of $Na_2S$ by the reduction of $Na_2SO_4$ has been known for a long time, and the reaction is represented by the following formulae:

$$Na_2SO_4 + 4C \rightarrow Na_2S + 4CO$$

$$Na_2SO_4 + 2C \rightarrow Na_2S + 2CO$$

However, in the case of reduction of $K_2SO_4$, according to the inventors' studies, the reaction proceeds according to the above-represented formulae (3) and (4), and so the by-production of $K_2CO_3$ is not inconvenient in the present invention. Accordingly, in the present invention, the reduction may be favorably stopped at the stage of the formula (3) as possible, and in such a case, the consumption of carbon resource will be smaller; a lower reaction temperature will be sufficient and a shorter time of the treatment will be satisfactory as compared to the case where the reaction is brought into proceeding to the state of formula (4).

In addition, $K_2SO_3$ and $K_2S_2O_3$ also result partially as by-products.

The reducing reactions can be conducted under heating by previously incorporating carbonaceous substance as a reducing agent, for example, coal, coke, petroleum pitch and petroleum coke or the like. With the use of coal as the reducing agent, the potassium sulfate is mainly reduced to potassium polyfulfide $K_2S_x$ ($1<x<2$) and the potassium carbonate is produced in to about 10 mol% at 900° C.-1000° C. At the temperature of 800° C.-900° C., the rate of potassium carbonate produced can be increased, for example, to about 40 mol%. Potassium imidodisulfonate and ammonium hydrogen sulfate fed to the reduction furnace 9 together with the potassium sulfate are also at the same time thermally decomposed as shown in the following schemes:

$$NH(SO_3K)_2 \rightarrow K_2SO_4 + SO_2 + \tfrac{1}{2}N_2 + \tfrac{1}{2}NH_3 \quad (6)$$

$$NH_4HSO_4 \rightarrow NH_3, N_2, H_2O, SO_3, SO_2 \quad (7)$$

The off-gas discharged from the reduction furnace 9 is burnt in a secondary combustion furnace 10 while blowing in air to convert $NH_3$ in the gas into nitrogen, and then the residual gas is returned to the cooling tower 2 since it contains $SO_2$.

The smelted material of potassium polysulfide and potassium carbonate taken out at a high temperature from the reduction furnace 9 is cooled and pulverized and, thereafter, brought into contact with gaseous carbon dioxide and steam at 350° C.-500° C., desirably, 380° C.-450° C. in a $H_2S$ generator 11 of dry type to evolve hydrogen sulfide.

$$K_2S_x + CO_2 + H_2O \rightarrow K_2CO_3 + H_2S + (X-1)S \quad (8)$$

wherein x represents a numeral above 1 to below 2.

The hydrogen sulfide thus generated has a concentration of 20-30% by volume (dry base), which is a sufficient concentration for producing sulfur through the Claus reaction.

In the Claus reactor 12, the $SO_2$ as an oxidizing agent for hydrogen sulfide may be replaced by the use of $SO_2$ obtained through the above-mentioned thermal decomposition of potassium dithionate, and the ratio of $H_2S/SO_2$ is retained at slightly higher than 2. The tail gas from the Claus reactor 12 is a gaseous mixture of carbon dioxide and steam also containing a small amount of hydrogen sulfide, and so the tail gas may be recycled again for the generation of hydrogen sulfide to the $H_2S$ generator 11.

$$2H_2S + SO_2 \rightarrow 2H_2O + 3S \quad (9)$$

All of the $K_2SO_3$, $K_2S_2O_3$ and the like contained in the above-mentioned smelted material can also be decomposed into hydrogen sulfide and gaseous sulfur.

$$4K_2SO_3 + CO_2 + H_2O \rightarrow 3K_2SO_4 + K_2CO_3 + H_2S \quad (10)$$

$$4K_2S_2O_3 + CO_2 + H_2O \rightarrow 3K_2SO_4 + K_2CO_3 + H_2S + 4S \quad (11)$$

The solids discharged from the $H_2S$ generator 11 contain $K_2CO_3$ and a small amount of $K_2SO_4$ and water insoluble components.

The solids are dissolved in water at a dissolution tank 13 to separate water insoluble components derived from the reducing agent at an ash separator 14, and the filtrate is mixed as an alkali source with the absorbing solution at a mixing tank 15 to maintain the pH value of the absorbing solution at 5.5 to 7.5. In this mixing course, gaseous $CO_2$ is released therefrom, and the gaseous $CO_2$ thus released is fed, for making up, to the foregoing dry carbonating step at the $H_2S$ generator 11.

$$K_2CO_3 + 2KHSO_3 \rightarrow 2K_2SO_3 + CO_2 + H_2O \quad (12)$$

The making-up amount may sometimes be insufficient using only the gaseous $CO_2$ released from $K_2CO_3$.

If the reactions (8), (9) and (12) are conducted completely, the amount of $CO_2$ is to be neither excessive nor insufficient theoretically, or rather the $CO_2$ is in excess by the amount for $K_2CO_3$ present in the smelted material.

However, since the $CO_2$ resulting from in the reaction (12) is partially dissolved in the absorbing solution, the recovery rate for $CO_2$ is about 60% of the theoretical amount under atmospheric pressure. In addition, since the Claus tail gas has to be purged partially, as an inert gas such as $N_2$ is inevitably mixed in the dry carbonation step (11), $K_2S_2O_6$ decomposition step (8) and Claus reaction step (12) as in usual ways of an industrial process, $CO_2$ is also lost partially.

If the amount of the $CO_2$ gas is insufficient as above, the recovered amount of $CO_2$ can be increased by causing gaseous $CO_2$ to be absorbed in the $K_2CO_3$ solution (the $CO_2$ gas may contain $O_2$ in this case) to partially convert it into $KHCO_3$.

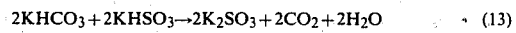

$$2KHCO_3 + 2KHSO_3 \rightarrow 2K_2SO_3 + 2CO_2 + 2H_2O \qquad (13)$$

Such a dry carbonation process ($H_2S$ generation process) is advantageous over the wet carbonation process ($H_2S$ generation process) known so far since it includes less steps, can gasify all of the S contents in the potassium polysulfide and can treat the by-products ($K_2SO_3$ and $K_2S_2O_3$) simultaneously through decomposition.

Moreover, while in the case of the wet carbonation process, the water-insoluble components are separated from a solution in which $K_2SO_3$ and $KHS$ co-exist, in the case of the dry carbonation process, the water-insoluble components are separated from the solution of $K_2CO_3$. Accordingly, it is one of the advantages of the dry carbonation process that the step is easier and more inexpensively carried out than the wet carbonation process from the view points of the operation of filtration and the selection of materials for the apparatus.

This process for removing $SO_x$ and $NO_x$, simultaneously incorporating such dry carbonation process, can absorb $NO_x$ and $SO_2$ very effectively and one obtains elemental sulfur and a concentrated gaseous $SO_2$ of much utility as by-products.

EXAMPLE 1

On feeding a gas of the following composition at a rate of 150 $Nm^3$/hr and an absorbing solution of the following composition at a rate of 1.7 t/hr to a packed absorption tower $15 \times 15$ $cm^2$ in square and 8 m in height, the $SO_2$ absorption rate was 98% and NO absorption rate was 81%, during 5 to 100 hrs of operation.

| Composition of the fed gas | $SO_2$ | 2600 ppm |
| --- | --- | --- |
| | NO | 180 ppm |
| | $O_2$ | 4% |
| | $N_2$ | balance |
| | temperature | 70° C. |
| Composition of absorbing solution | Fe-EDTA | 0.225 mol/kg |
| | $K_2SO_3$ | 0.95 mol/kg |
| | pH | 6.5 (adjusted by the addition of $K_2CO_3$) |
| | temperature | 55° C. |
| | liquid amount in absorption tank | 250 kg |

In the course of the above gas absorption, the absorbing solution was drawn out partially at 75 kg/hr and cooled to 35° C., and the potassium salt crystallized was separated and thoroughly washed with cold water. The filtrate and the washing solution were combined and incorporated with potassium carbonate and returned to the absorbing solution tank for recycling use. The crystals separated amounted to 198 kg (dry amount) after 100 hours' operation. This was a mixture of 146 kg of $K_2S_2O_6$, 23 kg of $NH(SO_3K)_2$ and 29 kg of $K_2SO_4$. On conducting Ca back titration for EDTA in the absorbing solution after 100 hours, it was analyzed to be 0.224 mol/kg.

EXAMPLE 2

The crystal mixture (dried products) separated in Example 1 was fed at a rate of 19.8 kg/hr under atmospheric pressure to a cylindrical external heating type decomposer having a stirrer in the inside. The decomposer was operated with its inside temperature set at 300°–310° C. As the result, $SO_2$ gas was generated at a rate of 1.37 $Nm^3$/hr and the decomposition residues were also obtained as $K_2SO_4$ at a rate of 13.9 kg/hr, $NH(SO_3K)_2$ at 1.8 kg/hr and $NH_4HSO_4$ at 0.23 kg/hr.

EXAMPLE 3

A mixture of $K_2SO_4$, $NH(SO_3K)_2$, $NH_4HSO_4$ and coal was continuously fed in the following amount to a reduction furnace of reverberatary furnace type, which furnace may be heated directly by a combustion gas at a high temperature resulted from a kerosene burner. The coal had 75% fixed carbon and it was used in the pulverized form of in 100–200$\mu$in size.

| Feed amount | $K_2SO_4$ | 13.9 kg/hr |
| --- | --- | --- |
| | $NH(SO_3K)_2$ | 1.8 kg/hr |
| | $NH_4HSO_4$ | 0.23 kg/hr |
| | coal | 3.4 kg/hr |

The solids thus fed were melted while foaming into a liquid of a low viscosity in about 10 minutes. The liquid temperature was controlled to about 850° C. The gases evolved at the thermal decomposition of $NH(SO_3K)_2$ are, as is shown in the following formula:

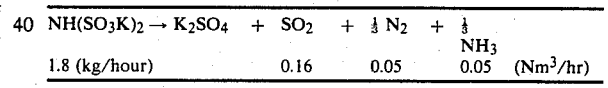

$$NH(SO_3K)_2 \rightarrow K_2SO_4 + SO_2 + \tfrac{1}{2} N_2 + \tfrac{1}{2} NH_3$$

| 1.8 (kg/hour) | 0.16 | 0.05 | 0.05 ($Nm^3$/hr) |

The resulting molten salt was caused to flow out of the furnace and cooled to solidify under $N_2$ atmosphere. The solids were obtained at a rate of 10.7 kg/hr and had the following composition.

| Composition of water soluble matter | | Composition of water insoluble matter | 3.1 wt. % |
| --- | --- | --- | --- |
| $K_2S_{1.7}$ | 61.5 mol % | | |
| $K_2CO_3$ | 32.3 mol % | | |
| $K_2SO_4$ | 2.9 mol % | | |
| $K_2S_2O_3$ | 3.2 mol % | | |
| $K_2SO_3$ | 0.1 mol % | | |

EXAMPLE 4

The reaction products obtained in Example 3 were fed at a rate of 10.7 kg/hr to a $H_2S$ generator of ball mill type being capable of external heating. $CO_2$ was blown at a rate of 5.0 $Nm^3$/hr and steam was blown at a rate of 3.5 kg/hr from the direction opposite to the inlet for feeding the products, that is, in a counter current manner and reacted with the solid products at an inside temperature of 410° C. As the result, gas containing 11 vol % of $H_2S$, 8 vol % of S, 44 vol % of $CO_2$ and 37 vol % of H₂O was obtained at a rate of 9.1 Nm³/hr and the reaction residues were obtained at a rate of 10.9 kg/hr. The residues contained 88.0 wt % of $K_2CO_3$, 5.2 wt % of $K_2SO_4$, 1.9 wt % of $K_2S$, 1.7 wt % of $K_2S_2O_3$, 0.1 wt % of $K_2SO_3$ and 3.1 wt % of water insoluble component.

What is claimed is:

1. In a process for treating an exhaust gas containing nitrogen oxides and sulfur dioxide, wherein said exhaust gas is brought into contact with an aqueous absorbing solution containing at least an iron chelate salt and an alkali sulfite for the production of absorption products, said absorbing solution containing said absorption products is cooled to crystallize and separate said absorption products by filtration, the filtrate is recycled to the above-mentioned step of contact between said exhaust gas and said absorbing solution, the thus obtained absorption products are reduced into ammonia or nitrogen and elementary sulfur, the improvement comprising the steps of:
   (a) heating the separated absorption products of potassium imidodisulfonate, potassium dithionate and potassium sulfate to a temperature of 250° to 400° C. to convert potassium dithionate into potassium sulfate and sulfur dioxide;
   (b) further heating a residual potassium imidodisulfonate to a temperature of 800° to 1000° C. in the presence of a carbonaceous substance selected from the group consisting of coal, coke, petroleum pitch and petroleum coke thereby decomposing said residual potassium imidodisulfonate into gaseous ammonia and at the same time reducing potassium sulfate into potassium polysulfide; and
   (c) heating potassium polysulfide in the presence of carbon dioxide and steam to a temperature of 350° to 500° C., preferably 380° to 450° C. thereby converting said potassium polysulfide into hydrogen sulfide, gaseous sulfur and potassium carbonate.

2. A process according to claim 1, wherein said separated products are heated to a temperature of 270° to 310° C.

3. A process according to claim 1, wherein said discharged gaseous ammonia is burned and converted to nitrogen.

4. A process according to claim 1, wherein said discharged hydrogen sulfide is converted into sulfur with use of said sulfur dioxide by a Claus reaction.

5. A process according to claim 1, wherein the discharged solid effluent of potassium carbonate is dissolved in water and solution thus obtained is mixed with the absorbing solution to maintain the pH value of the absorbing solution at 5.5 to 7.5.

* * * * *

UNITED STATES PATENT AND TRADEMARK OFFICE
CERTIFICATE OF CORRECTION

PATENT NO. : 4,288,421
DATED : September 8, 1981
INVENTOR(S) : Yoshihiko KUDO ET AL It is certified that error appears in the above—identified patent and that said Letters Patent is hereby corrected as shown below:

Column 3, line 26, change "$Na_2SO_4 + 2C \rightarrow Na_2S + 2CO$" to --$Na_2SO_4 + 2C \longrightarrow Na_2S + 2CO_2$--

Column 4, lines 42 and 43, change

"$4K_2S_2O_3 + CO_2 + H_2O \longrightarrow 3K_2SO_4 + K_2CO_3 + H_2S + 4S$"

to --$4K_2S_2O_3 + CO_2 + H_2O \longrightarrow 3K_2SO_4 + K_2CO_3 + H_2S + 4S$--

Signed and Sealed this

Thirteenth Day of April 1982

[SEAL]

Attest:

GERALD J. MOSSINGHOFF

Attesting Officer      Commissioner of Patents and Trademarks